United States Patent [19]
Jamonet et al.

[11] Patent Number: 4,711,721
[45] Date of Patent: Dec. 8, 1987

[54] WASTE WATER SLUDGE THICKENER WITH ODOR CONTROL

[75] Inventors: Bernard Jamonet, Bourg de Peage; Alain Rigouard, Echirolles; Jean-Pierre Bouchez, Les Eymes; Jean Duc, Versailles, all of France

[73] Assignee: L'Air Liquide, Societe Anonyme pour l'Etude et l'Exploitation des Procedes Georges Claude, Paris, France

[21] Appl. No.: 748,697

[22] Filed: Jun. 25, 1985

Related U.S. Application Data

[60] Division of Ser. No. 577,742, Feb. 7, 1984, abandoned, which is a continuation of Ser. No. 381,622, May 24, 1982, abandoned.

[30] Foreign Application Priority Data

May 25, 1981 [FR] France ................................ 81 10315

[51] Int. Cl.$^4$ ................................................. C02F 1/72
[52] U.S. Cl. ......................................... 210/607; 210/621; 210/622; 210/758; 210/765
[58] Field of Search ............... 210/607, 622, 631, 758, 210/765, 621

[56] References Cited

U.S. PATENT DOCUMENTS 4,082,671  4/1978  Kelly ................................ 210/195.1
4,163,712  8/1979  Smith ................................ 210/622
4,173,532  11/1979  Keoteklian .......................... 210/631

FOREIGN PATENT DOCUMENTS 2737806  9/1978  Fed. Rep. of Germany .
2366228  4/1978  France .
2441586  6/1980  France .
1497105  1/1978  United Kingdom .

OTHER PUBLICATIONS

Wastewater Treatment Plant Design; Sludge Preparation Drying, and Reduction, p. 455, 1977, Joint Committee of Water Pollution Cont. Fed. and the Am. Soc. of Civil Eng., Wash. D.C.
Frenzel, H. J. et al., "Abbau von Filtratwassern . . .", Das Gas und Wasserfach, vol. 118, Jan. 1977, pp. 24–29.

Primary Examiner—David Sadowski
Attorney, Agent, or Firm—Young & Thompson

[57] ABSTRACT

In a sludge thickener, supernatant fluid is drawn off via peripheral ducts and oxygenated at a suitable location. The supernatant fluid is thereafter reintroduced into the thickener via diffusers distributed transversely of the thickener and intermediate the peripheral ducts. The generation of nauseating smells is thereby prevented, and an advantageous increase of the concentration of the sludges is attained.

1 Claim, 2 Drawing Figures

4,711,721

WASTE WATER SLUDGE THICKENER WITH ODOR CONTROL

This application is a division, of application Ser. No. 577,742, filed Feb. 7, 1984, now abandoned, which is a continuation of application Ser. No. 381,622 filed May 24, 1982, now abandoned.

BACKGROUND OF THE INVENTION

The present invention relates to the treatment of sludges issuing from a reservoir for purification of waste waters, of the kind comprising a sludge thickener producing an overflowing fluid and a very concentrated sludge which is extracted from the bottom of the thickener.

During this thickening operation, and especially in the case of fermentable organic sludges, the thickeners frequently form the locus of nauseating smell discharges and often have their correct action impeded by fermentation reactions which leads to application of substantial quantities of coagulating and flocculating reactants during the following dehydrating stage. It has already been proposed to provide an oxygenation of the overflowing fluid by dissolution of industrial oxygen which is performed by withdrawing some of the overflowing fluid which is transferred into an industrial oxygenating station and is re-injected into the overflowing fluid. Since it is too primitive, the apparatus proposed is quite inappropriate however to resolve the dual problem of extensive oxygenation of the overflowing fluid which normally requires powerful agitation of the upper portion, that is of the overflowing fluid, keeping the lower portion, meaning the sludges in process of being thickened, in the almost wholly undisturbed condition.

SUMMARY OF THE INVENTION

In accordance with the invention, these objects are secured by providing a thickener which comprises a cylindro-conical tank fitted with a bottom or inverted scraper, and the means of re-injecting oxygenated supernatant fluid comprise skirt-type diffusors distributed at the surface.

BRIEF DESCRIPTION OF THE DRAWINGS

In order that the invention may be more clearly understood, reference will now be made to the accompanying drawings, which show one embodiment thereof by way of example and in which.

DETAILED DESCRIPTION OF PREFERRED EMBODIMENT

Figure 1:
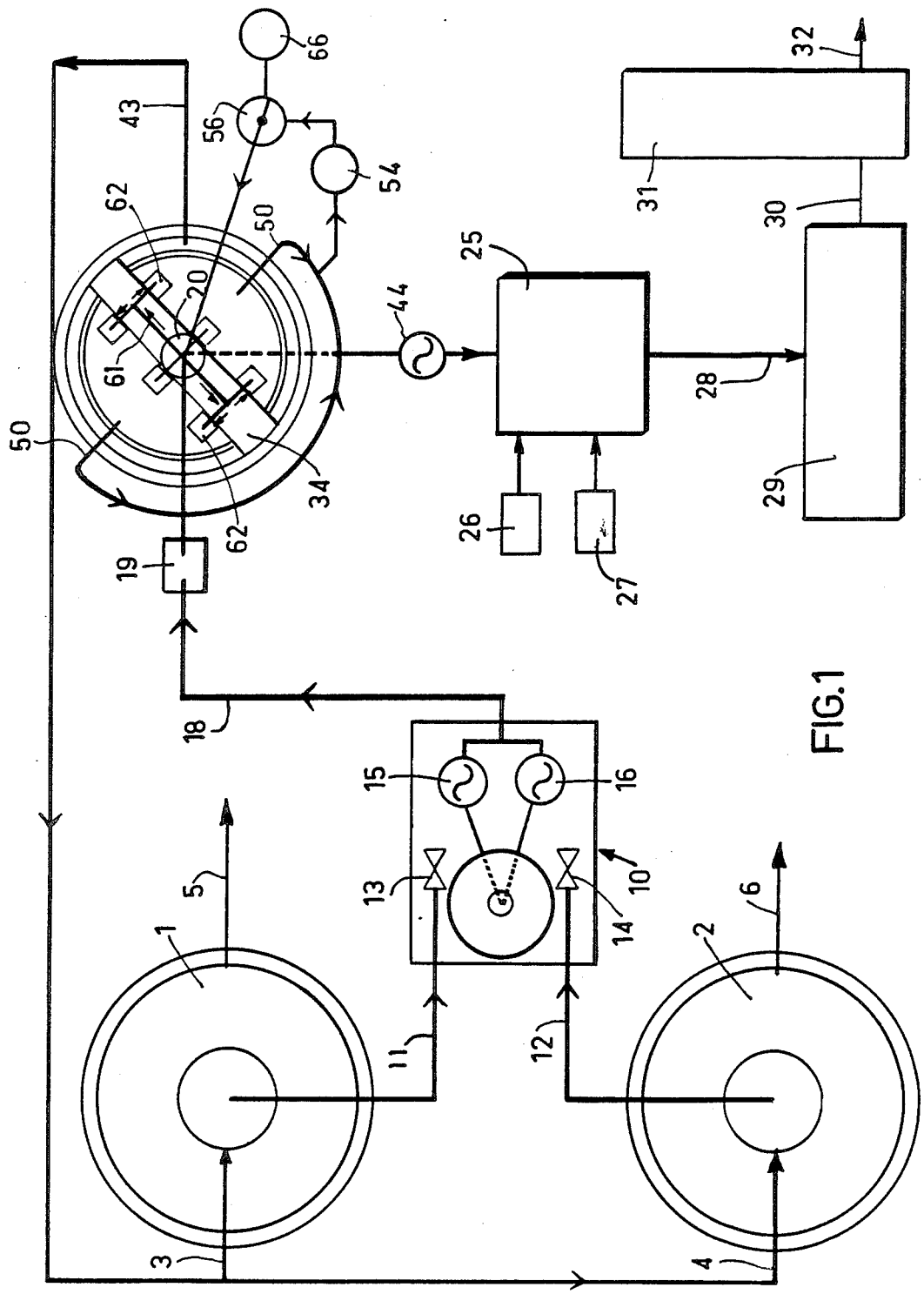
FIG. 1 is a diagrammatical plan view of apparatus, according to the invention.
Figure 2:
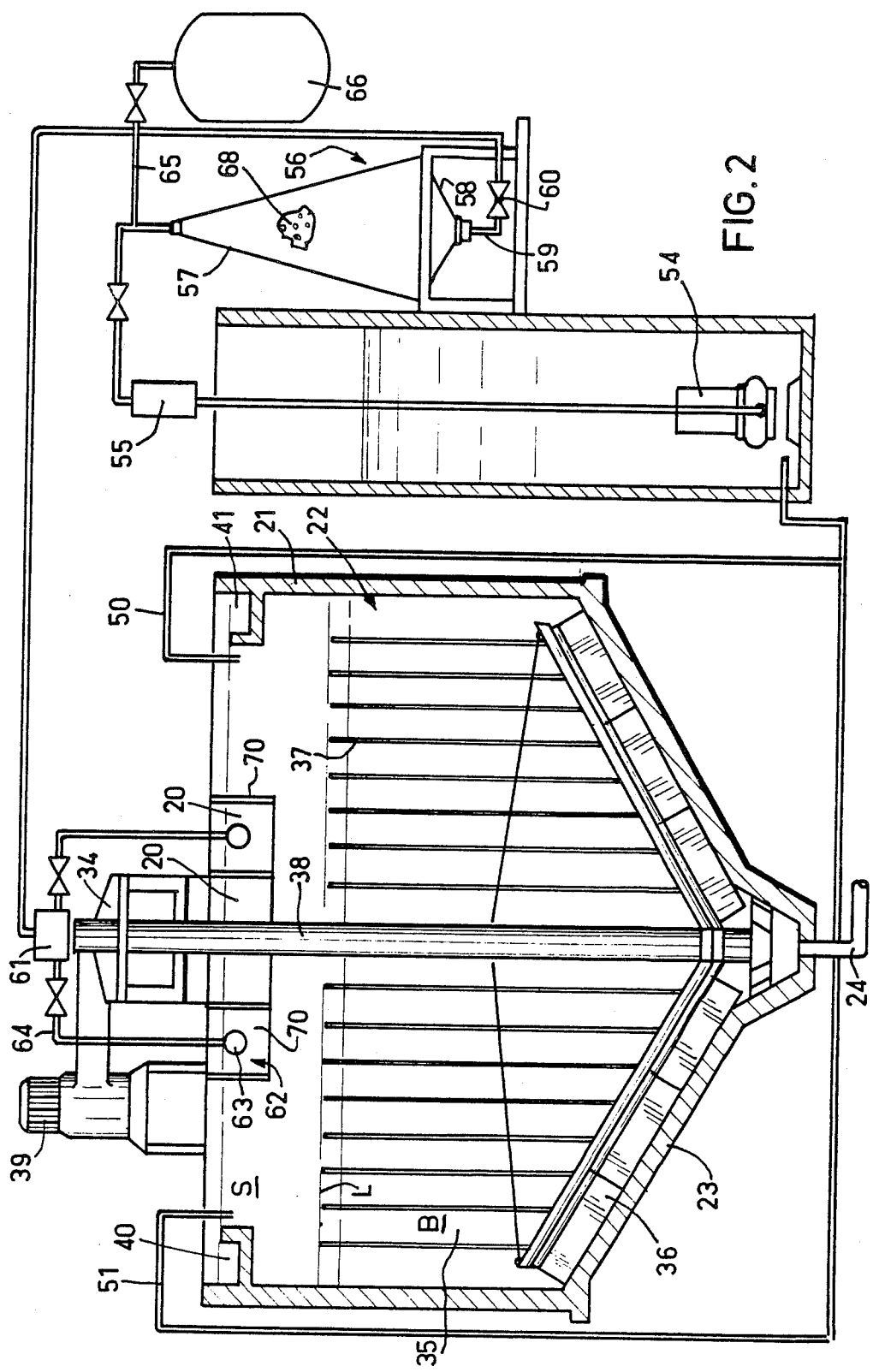
FIG. 2 is an axial section through a thickening or settling tank.

Referring now to the accompanying drawings, apparatus for treatment of fresh sludges coming for example from flocculating clarifiers 1 and 2 supplied with waste waters at 3 and 4 and providing purified effluents 5 and 6, comprises a sludge pit 10 supplied with fresh sludge from the clarifiers 1 and 2 via pipes 11 and 12 incorporating pneumatic valves 13 and 14. Pumps 15 and 16 submerged in the pit 10 impel the sludges through a pipe 18 to a supply tank 19 which itself delivers the sludge into a distributor 20 mounted axially in a tank 21 of a thickener 22 which comprises a tank floor 23 of downwardly convergent conical shape, in which the thickened sludge is drawn off at 24 for transfer by means of a pump 44 to a flocculating tank 25 provided with a ferric chloride supply 26 and a lime supply 27, the sludge thus flocculated then being conveyed via a pipe 28 to a filter press 29. The sludge thus pressed is transferred at 30 to an incinerator 31, the incineration products then being discharged at 32.

In conventional manner, the thickener 22 has installed on a transverse bearer beam 34, a rotary device 35 having a vertical extent and in a lower section forming a floor or inverted scraper 36 and in a diametrical plane having a plurality of vertical arms 37 forming a kind rake, the whole being carried by a vertical shaft 38 rotated at a low speed by a geared motor 39. Also in conventional manner, the thickener 22 is provided with overflows 40–41 for withdrawal of a part of the supernatant fluid which is recycled via a pipe 43 to the entries of the clarifiers 1 and 2 (FIG. 1).

According to the invention, the thickener described above is provided with a device for oxygenating the supernatant fluid, which essentially comprises a plurality of extraction pipes 50 and 51 leading into high and peripheral areas of the thickener 22 and connected to a variable speed pump 54 delivering the supernatant fluid via a flow meter 55 into the top of an oxygenation device of the dual cone type 56 having a downwardly divergent upflow section 57 and a downflow section 58 greatly convergent towards the bottom, the lower tip of which is connected via a pipe 59 comprising a valve 60 to an upper distributor 61 for reinsertion of the supernatant fluid into the thickener, this distributor 61 supplying a series of diffusers 62 arranged along the entire length of the supporting beam 34, each diffuser 62 comprising a distributor 63, each being supplied from the distributor 61 via a pipe 64 and situated at the centre of a skirt 70 of vertical extent from the supernatant fluid level to approximately half the height of the supernatant fluid S, and it will be noted that the areas of extraction of the supernatant fluid via the pipes 50 and 51 are situated as far as possible from the skirt type diffusers, that is from the supporting beam 34 in this case. In a manner well known per se, the dual cone 56 is supplied at the top via a pipe 65 from a source 66 of industrial oxygen and in the divergent portion 57, this oxygen forms a cloud of bubbles 68 the lower part of which at least is practically stationary given the progressive decrease of the speed of the supernatant fluid in its downward displacement.

Experience shows that the system described allows of satisfactory oxygenation of the supernatant fluid S which is separated from the sludge B in the process of being thickened, by a rather clear delimitation L. Slow downward displacements of the supernatant fluid occur within the skirts which are transformed at the lower end of the skirts into horizontal displacements towards the periphery (take-up via the pipes 50 and 51). This section of supernatant fluid oxygenated in this manner forms an impassable barrier against the foul smells generated within the sludge B, without thereby obstructing the thickening operation.

Although it is possible to oxygenate at comparatively high concentrations of dissolved oxygen, it is advantageous to limit this concentration to a low level to ensure minimum oxygen consumption; an appropriate value lies in the region of 1 mg/liter, whereas the dissolved oxygen proportion in the dual cone may reach 15 mg/liter.

In another embodiment which has been applied in practice, four diffusers 62 were utilised with a flow of supernatant fluid of 100 m³/hr equally divided between the diffusers 62, for a thickener 22 receiving a flow of 30 m³/hr of sludges to be thickened. The oxygenation of the supernatant fluid results in complete deodourisation of the works and very substantial improvement of the sludge thickening action, demonstrated by the period required for their dehydration which occurs in the filter, and this dehydration period changes from 2½ hours (without oxygentation) to 1½ hours (with oxygenation). On the other hand, this oxygenation of supernatant fluid leads to a substantial saving on chemical reactants utilised in the flocculating tank and, by way of example, it was observed that the proportion of reactants utilised changes from 12% to 4% as compared to the weight of dry materials processed.

The present invention has as its sphere of application the thickening operation in any purifying station receiving primary sludges or supplying secondary sludges, cooked sludges after heat treatment, etc, as well as the manure pits of pig raising enterprises.

We claim:

1. A process for thickening waste water sludge issued from a clarifier for waste water, comprising the steps of: introducing fresh waste water sludge, issued from a clarifier, into a central upper part of a thickening tank of circular shape having a lower part having a bottom in the form of an upwardly opening cone and having scraper means rotatable at low speed in said lower part of the tank and having arms extending upwardly from said lower part of the tank, thereby to form a lower thickened sludge layer and an upper supernatant layer upon rotation of said scraper means, while at the same time imparting only a minimum of agitation to the sludge layer and to the supernatant layer above it; removing thickened sludge through a central aperture in said bottom of the tank; withdrawing supernatant from said supernatant layer at at least one first upper peripheral portion of said tank and recycling it to an input of said clarifier, and further withdrawing supernatant from said supernatant layer at opposite second upper peripheral portions of the tank substantially at the surface of said supernatant layer and oxygenating this further withdrawn supernatant in an oxygenation device, and reintroducing said oxygenated, further withdrawn supernatant into said supernatant layer in said tank by means of a plurality of diffusers mounted on and distributed along a support extending transversely across said circular tank and disposed above said supernatant layer, said diffusers extending downwardly from said support into said supernatant layer and said support being disposed intermediate said opposite second upper peripheral portions of said tank and extending perpendicular to a line interconnecting said opposite second upper peripheral portions, in order both to minimize agitation of said supernatant layer in said tank and to avoid any direct mixing of said further withdrawn supernatant with the supernatant layer in the tank in the vicinity of said first and second peripheral portions.

* * * * *